(12) United States Patent
Palazzolo et al.

(10) Patent No.: US 8,234,955 B2
(45) Date of Patent: Aug. 7, 2012

(54) POWER TRANSFER UNIT WITH DISCONNECTING INPUT SHAFT

(75) Inventors: Joseph Palazzolo, Commerce Township, MI (US); Jason F. Bock, Sterling Heights, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 1003 days.

(21) Appl. No.: 12/205,982

(22) Filed: Sep. 8, 2008

(65) Prior Publication Data

US 2010/0058890 A1    Mar. 11, 2010

(51) Int. Cl.
*B60K 17/354* (2006.01)
(52) U.S. Cl. .......... 74/665 F; 74/665 G; 180/247
(58) Field of Classification Search ............ 180/247, 180/248, 249; 74/665 F, 665 G
See application file for complete search history.

(56) References Cited

U.S. PATENT DOCUMENTS

| | | | |
|---|---|---|---|
| 4,373,604 A | 2/1983 | Lunn et al. | |
| 4,562,897 A | 1/1986 | Renneker | |
| 4,690,015 A | 9/1987 | Nagano et al. | |
| 4,711,136 A | 12/1987 | Yoshinaka et al. | |
| 4,723,459 A | 2/1988 | Yoshinaka et al. | |
| 4,723,624 A * | 2/1988 | Kawasaki et al. | 180/233 |
| 4,744,435 A * | 5/1988 | Schnurer | 180/233 |
| 4,829,849 A * | 5/1989 | Masuda et al. | 74/650 |
| 4,875,698 A * | 10/1989 | Uchiyama | 180/233 |
| 4,899,859 A * | 2/1990 | Teraoka | 192/221 |
| 4,967,616 A | 11/1990 | Minami et al. | |
| 4,980,521 A * | 12/1990 | Hiramatsu et al. | 192/60 |
| 5,006,098 A | 4/1991 | Yoshinaka et al. | |
| 5,597,369 A | 1/1997 | Brissenden et al. | |
| 6,598,721 B2 * | 7/2003 | Schmidl | 192/48.5 |
| 6,949,044 B2 * | 9/2005 | Glassner | 475/213 |
| 7,383,910 B2 * | 6/2008 | Mori et al. | 180/245 |
| 7,421,324 B2 * | 9/2008 | Terada | 701/41 |
| 7,721,834 B2 * | 5/2010 | Boctor et al. | 180/182 |
| 7,975,796 B2 * | 7/2011 | Guo | 180/247 |
| 2004/0254704 A1 * | 12/2004 | Terada | 701/41 |

FOREIGN PATENT DOCUMENTS

EP    0202079 A1    11/1986

* cited by examiner

*Primary Examiner* — Ha D. Ho
(74) *Attorney, Agent, or Firm* — Jennifer M. Brumbaugh; Mick A. Nylander; Rader, Fishman & Grauer PLLC (57) ABSTRACT

A power transfer unit assembly for a vehicle is provided comprising a first input shaft providing rotational drive. A second input shaft is in communication with a gear train assembly which is in communication with a propshaft. A selective engagement element is movable between an engagement position wherein the second input shaft is placed in rotational communication with the first input shaft and a disengagement position wherein the second input shaft is disengaged from the first input shaft. An actuator assembly moves the selective engagement element into the engagement position for all wheel drive mode and into the disengagement position for two wheel drive mode.

14 Claims, 7 Drawing Sheets

POWER TRANSFER UNIT WITH DISCONNECTING INPUT SHAFT

TECHNICAL FIELD

The present invention relates to a power transfer unit for a selective all wheel drive vehicle. In particular, the invention is a power transfer unit with a disconnecting input shaft.

BACKGROUND OF THE INVENTION

Fuel efficiency is a controlling factor in the design of modern vehicles. Vehicle designers wage a constant battle with vehicle weight and performance in order to provide increased fuel efficiency. The desire for improved fuel efficiency, however, cannot come at the cost of expected vehicle performance. As such, in many environments the need for part time all wheel drive is accepted as a design necessity even though it commonly comes with a penalty to fuel efficiency. One purveyor of this inefficiency is the power transfer units commonly utilized in modern vehicle production.

Power transfer units are commonly utilized in front wheel drive based all wheel drive systems. A power transfer unit transmits the torque from the transmission to a propshaft, which in turn delivers power to the rear wheels. Most power transfer units are always in a ready state, commonly controlled by a slipping clutch near the rear axle, and yet are utilized only a small fraction of the time during driving. In this "ready state" the existing power transfer units exhibit a full-time drain to fuel efficiency with only a part-time benefit. A method and system that would allow in increase in efficiency more on par with the part-time benefit would be highly beneficial.

Thus, in front-wheel-drive based all-wheel-drive systems, there exists a need for improving the efficiency of power transfer units such that their full-time drain on fuel efficiency is negated or minimized.

SUMMARY OF THE INVENTION

A power transfer unit assembly for a vehicle is provided comprising a first input shaft providing rotational drive. A second input shaft is in communication with a gear train assembly, which is in communication with a propshaft. A selective engagement element is movable between an engagement position wherein the second input shaft is placed in rotational communication with the first input shaft and a disengagement position wherein the second input shaft is disengaged from the first input shaft. An actuator assembly moves the selective engagement element into the engagement position for all wheel drive mode and into the disengagement position for two wheel drive mode.

Other advantages and features of the invention will become apparent to one of skill in the art upon reading the following detailed description with reference to the drawings illustrating features of the invention by way of example.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

In the following description, various operating parameters and components are described for one constructed embodiment. These specific parameters and components are included as examples and are not meant to be limiting.

Figure 1:
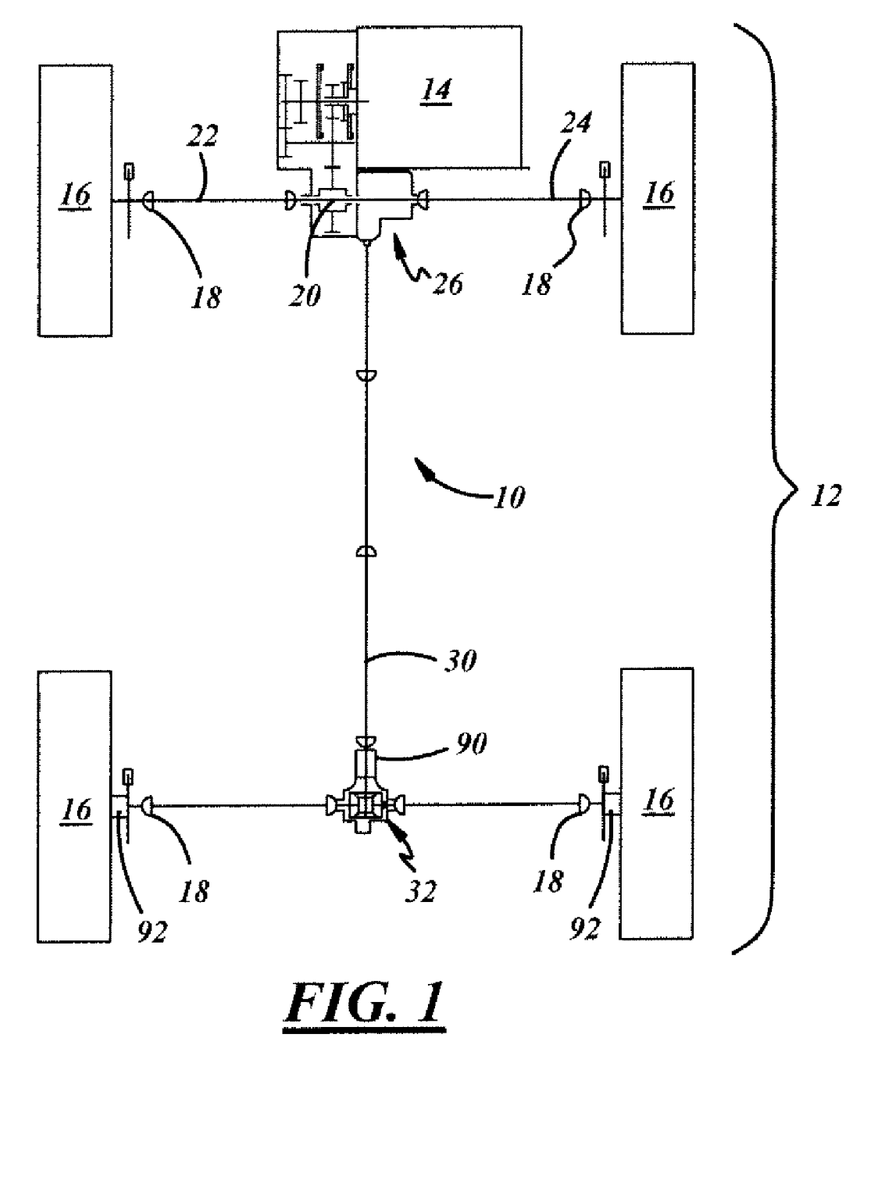
FIG. 1 is a schematic diagram of an automobile powertrain utilizing a power transfer unit according to one embodiment of the present invention.
Figure 2:
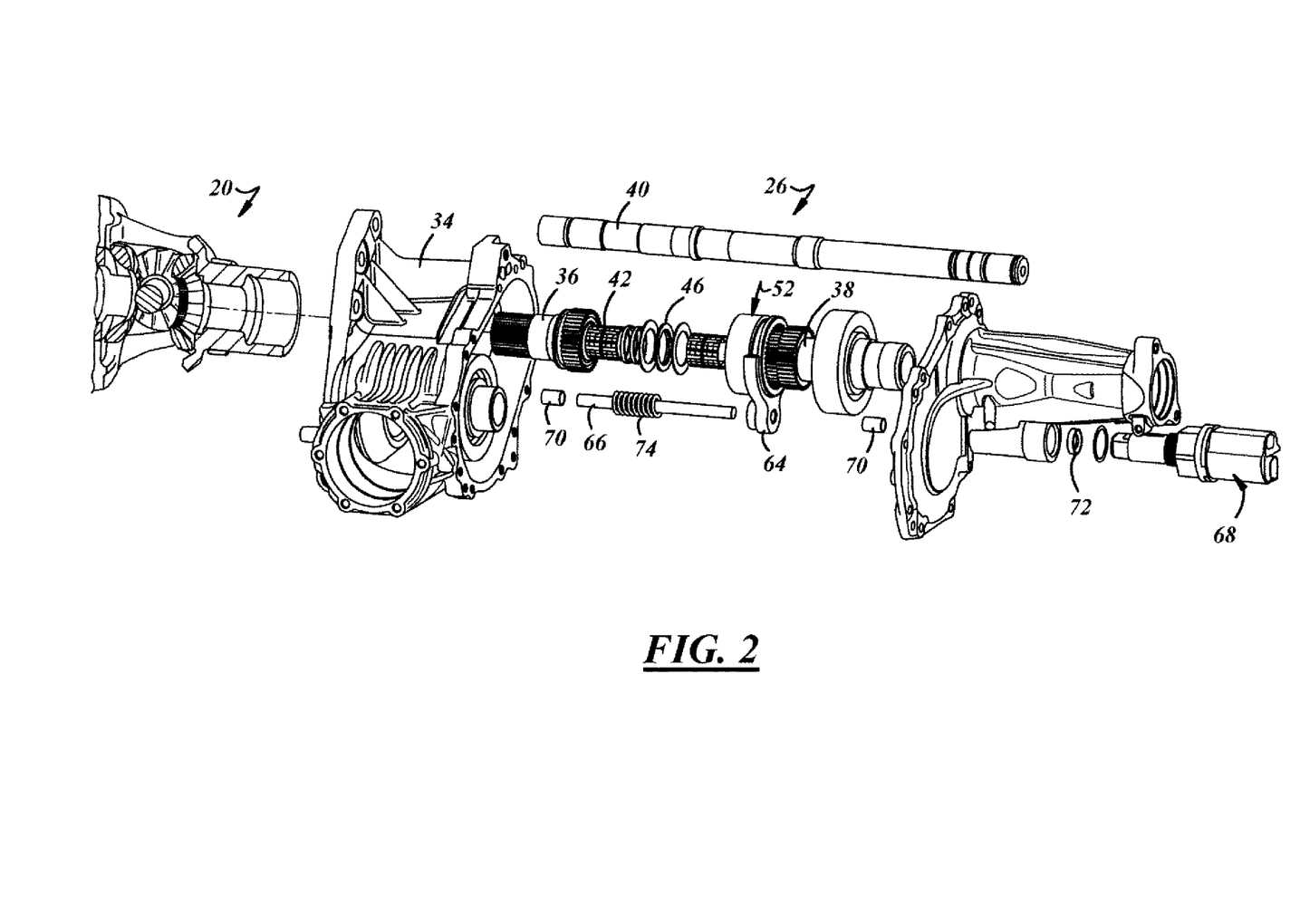
FIG. 2 is an exploded view diagram of the power transfer unit as illustrated in FIG. 1.
Figure 3:
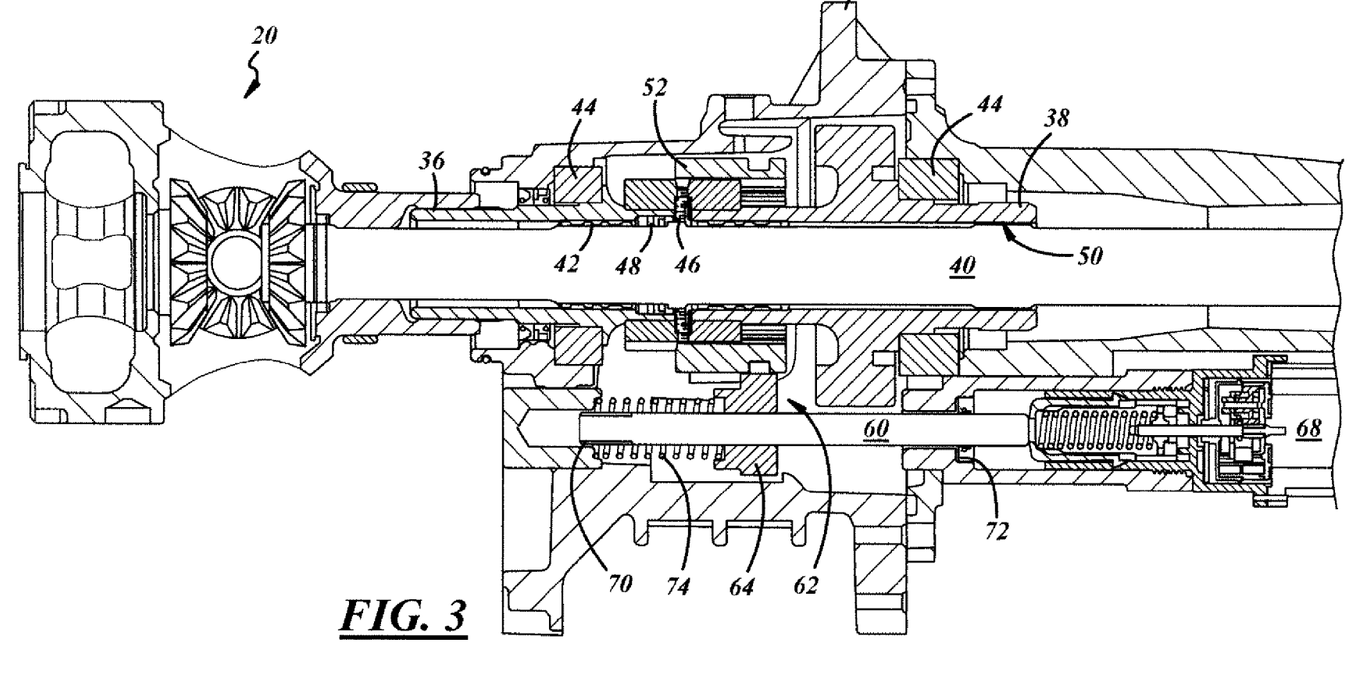
FIG. 3 is a cross-sectional illustration of the power transfer unit illustrated in FIG. 2.
Figure 4:
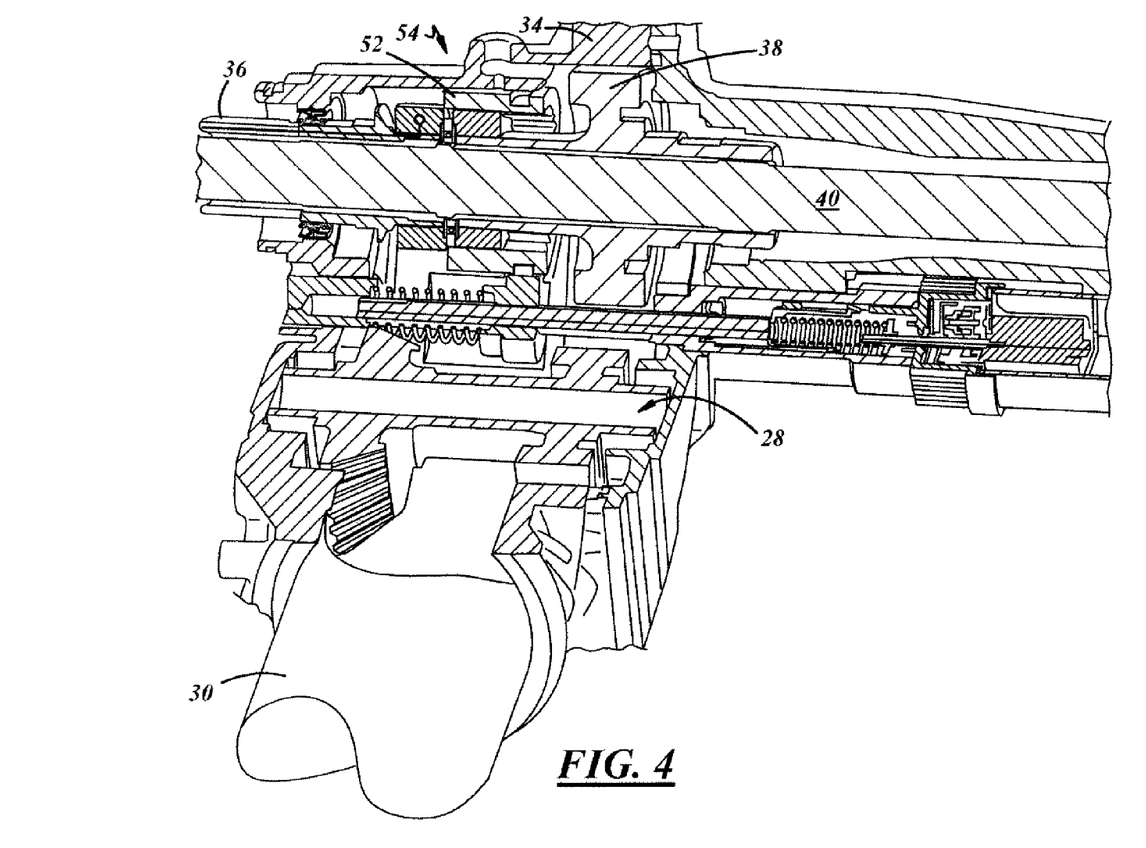
FIG. 4 is a cut-away diagram illustrating the power transfer unit illustrated in FIG. 2, the power transfer unit illustrated in the disengaged position.
Figure 5:
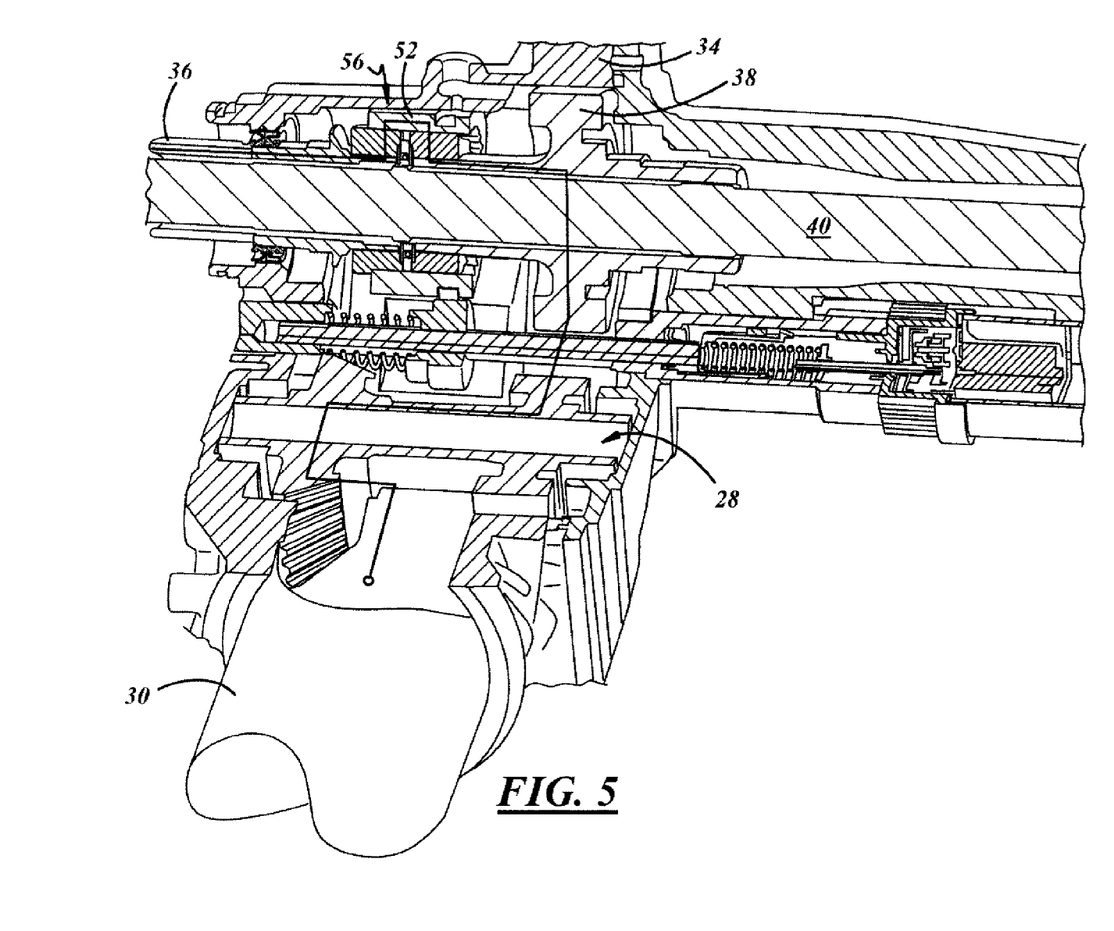
FIG. 5 is a cut-away diagram illustrating the power transfer unit illustrated in FIG. 2, the power transfer unit illustrated in the engaged position.

Referring now to FIG. 1 which is a schematic of a automotive power-train assembly 10 in accordance with the present invention. The vehicle 12, represented schematically, is illustrated as a front wheel drive vehicle with transverse engine 14 mounting. The vehicle 12 includes a plurality of wheels 16 and joints 18 as customary but is not intended to be limiting. Similarly, the engine 14 supplies torque to the transmission output 20 which is utilized to direct torque to side shafts 22,24 and finally to the wheels 16. The present invention, however, includes a power transfer unit 26 in communication with the transmission output 20 and positioned between the transmission output 20 and a side shaft 24. The power transfer unit 26 is utilized in combination with a gear train 28 (see FIGS. 4 and 5) to transfer power from the transmission output 20 to a propshaft 30. The propshaft 30, in turn, is commonly used with a rear differential 32 to deliver power to the rear wheels.

The present invention, however, utilizes a novel and unique power transfer unit 26 as illustrated in FIGS. 2-5. The power transfer unit 26 is comprised of a transfer unit housing 34 housing a first input shaft 36 and a second input shaft 38. The second input shaft 38 is in communication with the gear train 28 and there through to the propshaft 30. An intermediate shaft 40 is positioned through the first and second input shafts 36,38 and may be separated through the use of a plurality of radial needle bearings 42. The first input shaft 36 and the second input shaft 38 are mounted within the housing via tapered roller bearings 44. A needle roller thrust bearing 46 may be positioned between the first and second input shafts 36,38 in order to generate the pre-load required by the tapered roller bearings 44 in this configuration. A first seal 48 may be positioned between the first input shaft 36 and the intermediate shaft 40 to prevent transmission fluid from entering the power transfer unit 26. A secondary seal 50 may be positioned between the second input shaft 38 and the intermediate shaft 40 to prevent lubricant from leaking out of the power transfer unit 26.

It should be noted that the first input shaft 36 and the second input shaft 38 are not directly engaged. Instead, the present invention contemplates the use of a selective engagement element 52 movable between a disengagement position 54

(see FIG. 4), wherein the first input shaft 36 is disengaged from the second input shaft 38 and the vehicle 12 is operating in two wheel drive mode, and an engagement position 56 (see FIG. 5), wherein the first input shaft 36 is engaged to the second input shaft 38 and the vehicle 12 is operating in all wheel drive mode. It is contemplated that the selective engagement element 52 is intended to encompass a wide variety of mechanisms. In one embodiment, it is contemplated that the selective engagement element 52 comprises a female spline collar (FIGS. 2-7). In other embodiments, the selective engagement element 52 may comprise a face gear assembly 60 (FIGS. 8-10) or similar arrangement. It is contemplated that the selective engagement element 52 may engage radially as in FIGS. 2-7 or axially as in FIGS. 8-10. In all embodiments, when the selective engagement element 52 is moved to the disengaged position 54 the second input shaft 38 and downstream structure are not directly robbing efficiency from the first input shaft 36.

The movement of the selective engagement element 52 may be accomplished in a variety of fashions. One embodiment contemplates the use of an actuator assembly 62 in communication therewith. The actuator assembly 62 is intended to encompass a wide variety of mechanical and electronic configurations in addition to automatic or manual implementation configurations. In one embodiment, the actuator assembly 62 is comprised of a shift fork 64 rotationally mounted to the second input shaft 38. A shift rod 66 is connected to the shift fork 64 to facilitate the movement of the shift fork 64 and therefore the female spline collar 52. An actuation element 68 may be mounted to the shift fork 64 to enable such movement. The shift rod 66 may be supported by linear slide bushings 70 and may include at least one axial seal 72 sealing the actuation element 68 from the internal fluids of the power transfer unit 26. A spring element 74 may be utilized to bias the shift rod 66 into the disengaged position 54. Thus the assembly operates in two wheel drive mode in the disengaged position 54. When all wheel drive mode is required, the actuation element 68 moves the shift rod 66 and shift fork 64 against the spring, moving the female spline collar 52 to engage both the second input shaft 38 and the first input shaft 36. In this condition, drive from the first input shaft 36 is transferred through the second input shaft 38 to the rear drive.

Figure 6:
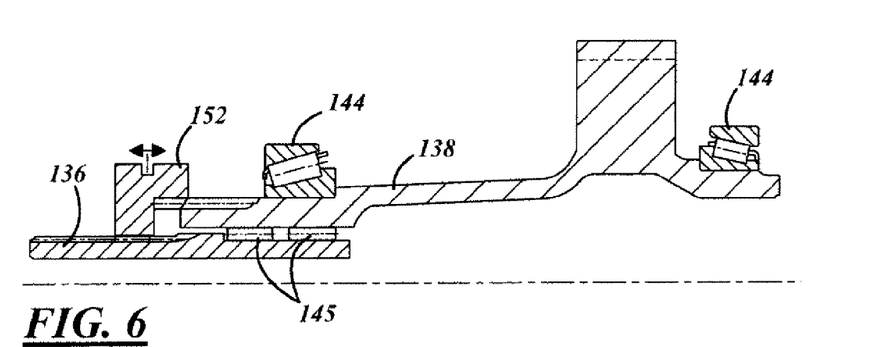
FIG. 6 is a detailed illustration of an alternate arrangement of the power transfer unit illustrated in FIG. 2.

Although the preceding embodiment was illustrated with the selective engagement element 52 in constant communication with the second input shaft 38 alternate configurations are contemplated. In FIG. 6, the selective engagement element 152 remains in communication with the first input shaft 136 and disengages from the second input shaft 138 in the disengaged position. In is further contemplated that the second input shaft 138 may be solely supported by pair of tapered roller bearings 144 at each end. A pair of input support bearings 145 may be mounted between the first input shaft 136 and second input shaft 138 such that these bearings are beneath the left tapered roller bearing 144. The advantage of mounting in this fashion is that during the disengaged position, the tapered roller bearings 144 do not rotate and therefore efficiency is further improved. In addition, the needle roller thrust bearing 46 from the previous embodiment may be eliminated as the proper preload is contained at all times within the second input shaft 138 mount.

Figure 7:
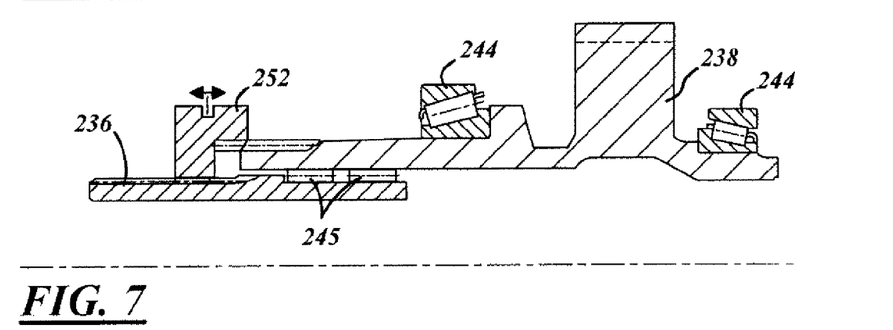
FIG. 7 is a detailed illustration of an alternate arrangement of the power transfer unit illustrated in FIG. 2.

FIG. 7 illustrates a modified version of the embodiment described above in FIG. 6. In this embodiment, however, the tapered roller bearings 244 are both located towards one end of the second input shaft 238 such that the input support bearings 245 are outside the left tapered roller bearings 244. The first input shaft 236, the selective engagement element 252, and the input support bearings 245 remain substantially identical.

Figure 8:
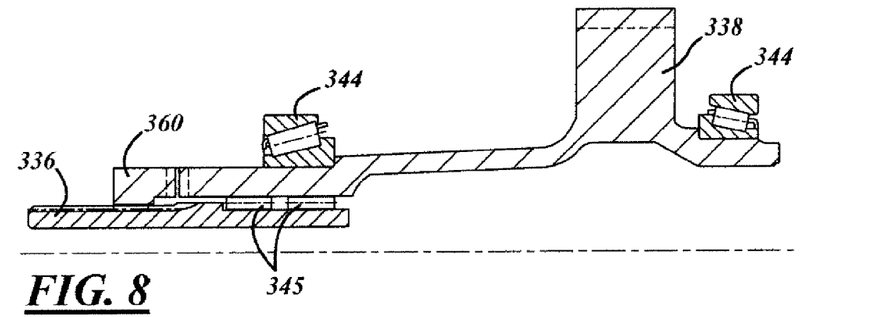
FIG. 8 is a detailed illustration of an alternate arrangement of the power transfer unit illustrated in FIG. 2.

FIG. 8 illustrates a modified version of the embodiment described in FIG. 6. In this embodiment, however, the selective engagement element 360, slidably mounted to the first input shaft 336 comprises face gears engaging the second input shaft 338 in an axial fashion rather than radially. The input support bearings 345 and tapered rolling bearings 344 remain substantially the same.

Figure 9:
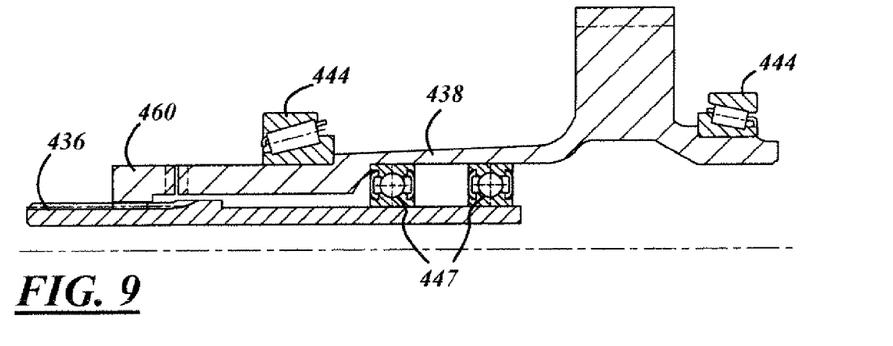
FIG. 9 is a detailed illustration of an alternate arrangement of the power transfer unit illustrated in FIG. 2.

FIG. 9 illustrates a modified version of the embodiment described in FIG. 8. In this embodiment, however, the first input shaft 436 is extended and the input support bearings 345 are replaced with a pair of ball bearings 447 positioned to the right of the left transverse roller bearing 444. The second input shaft 438 and selective engagement element 452 remain substantially the same.

Figure 10:
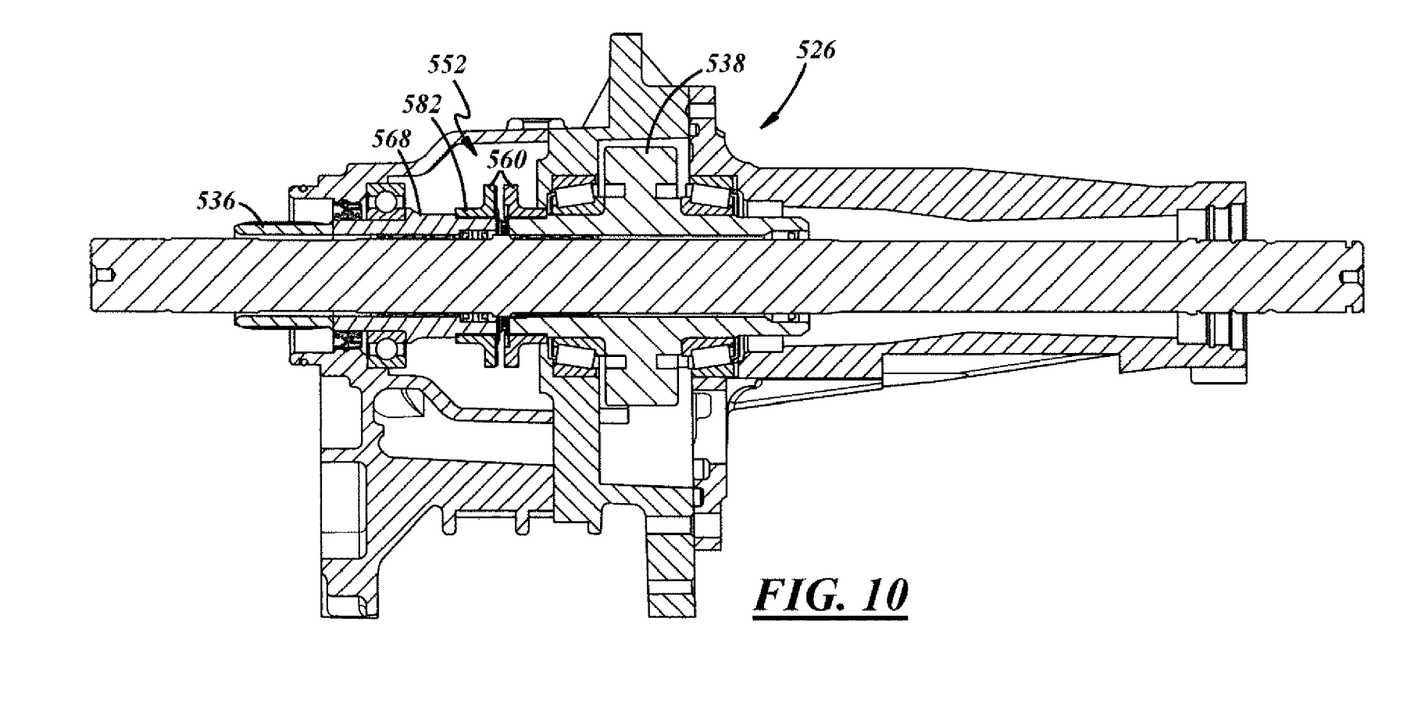
FIG. 10 is a detailed illustration of an alternate arrangement of the power transfer unit illustrated in FIG. 2.

FIG. 10 illustrates a modified version of the present invention wherein the selective engagement element 552 comprises face gears 560. Furthermore, this embodiment contemplates a smaller axial package with the actuation element positioned within the power transfer unit 526 and push on an application component or mechanism. The component or mechanism is connected to the back of the face gear 560 that can move axially and thereby be captured on the first input shaft 536 when the dog clutch is engaged and the second input shaft 538 is driven.

Finally, the present invention has provided a unique mechanism in which the power transfer unit 26 is capable of completely disengaging a second input shaft 38, a gear train 28 and propshaft 30 from the first input shaft 36 to provide increased efficiency in two wheel drive mode. The present invention further contemplates the use of a rear disconnect such as a rear axle disconnect 90 and/or rear wheel disconnects 92 (see FIG. 1) used in combination with the power transfer unit 26. This allows addition benefits as additional drive train elements will be stationary in two wheel drive mode and therefore efficiency is further increased.

It should be understood that although the power transfer unit 26 has been largely illustrated in a single embodiment of a two stage power transfer unit, it should be understood that the present invention is intended to be applicable to a wide variety of power transfer units including, but not limited to, single stage PTUs and three stage PTUs. In addition, although the selective engagement element 52 is described as being between a first input shaft 36 and a second input shaft 38, it is contemplated that the term "input shaft" may be interpreted to comprise any torque input shafts within the power transfer unit 26. As such, they may include traditional input shafts, idler shafts, intermediate shafts, pinion output shafts etc.

From the foregoing, it can be seen that there has been brought to the art a new and improved power transfer unit which has advantages over prior vehicle drive systems. While the invention has been described in connection with one or more embodiments it should be understood that the invention is not limited to those embodiments.

What is claimed is:

1. A power transfer unit assembly for a vehicle comprising:
a first input shaft providing rotational drive;
a second input shaft;
a gear train assembly in communication with said second input shaft;
a propshaft in communication with said gear train;
an intermediate shaft positioned through said first input shaft and said second input shaft;
a selective engagement element movable between an engagement position wherein said second input shaft is placed in rotational communication with said first input shaft and a disengagement position wherein said second input shaft is disengaged from said first input shaft; and an actuator assembly in communication with said selective engagement element, said actuator assembly moving said selective engagement element into said engagement position for all wheel drive mode, said actuator assembly moving said selective engagement element into said disengagement position for two wheel drive mode.

2. A power transfer unit assembly as described in claim 1, wherein said selective engagement element comprises a female spline collar.

3. A power transfer unit assembly as described in claim 2, wherein said female spline collar engages radially in said engagement position.

4. A power transfer unit assembly as described in claim 2, wherein said female spline collar engages axially in said engagement position.

5. A power transfer unit assembly as described in claim 2, wherein said selective engagement element further comprises:
   a shift fork rotationally mounted to said second input shaft; and
   a shift rod placing said actuator assembly in communication with said shift fork.

6. A power transfer unit assembly as described in claim 1, further comprising:
   a rear disconnect.

7. A power transfer unit assembly as described in claim 1, wherein said first input shaft is supported by a first bearing, said second shaft is supported by a second bearing, and a thrust bearing may be positioned between said first input shaft and said second input shaft.

8. A power transfer unit assembly as described in claim 1, wherein said second input shaft is supported by two bearings.

9. A power transfer unit assembly as described in claim 1, wherein selective engagement element remains in communication with said second input shaft when in said disengaged position.

10. A power transfer unit assembly as described in claim 1, wherein selective engagement element remains in communication with said first input shaft when in said disengaged position.

11. A power transfer unit assembly for a vehicle comprising:
   a first input shaft providing rotational drive;
   a second input shaft;
   an intermediate shaft positioned through said first input shaft and said second input shaft; and
   a selective engagement element movable between an engagement position for all wheel drive mode wherein said second input shaft is placed in rotational communication with said first input shaft and a disengagement position for two wheel drive mode wherein said second input shaft is disengaged from said first input shaft.

12. A power transfer unit assembly as described in claim 11, wherein said selective engagement element comprises a female spline collar.

13. A power transfer unit assembly as described in claim 12, wherein said female spline collar engages radially in said engagement position.

14. A power transfer unit assembly as described in claim 11, further comprising:
   an actuator assembly in communication with said selective engagement element, said actuator assembly moving said selective engagement element into said engagement position for all wheel drive mode, said actuator assembly moving said selective engagement element into said disengagement position for two wheel drive mode.

* * * * *